US008824324B2

(12) United States Patent
Bhalla

(10) Patent No.: US 8,824,324 B2
(45) Date of Patent: Sep. 2, 2014

(54) METHODS AND APPARATUS FOR CONFIGURING SUBSCRIBER QUALITY OF SERVICE PROFILES

(75) Inventor: Rajesh Bhalla, Gahanna, OH (US)

(73) Assignee: ZTE (USA) Inc., Morristown, NJ (US)

(*) Notice: Subject to any disclaimer, the term of this patent is extended or adjusted under 35 U.S.C. 154(b) by 89 days.

(21) Appl. No.: 13/306,961

(22) Filed: Nov. 29, 2011

(65) Prior Publication Data

US 2012/0134286 A1     May 31, 2012

Related U.S. Application Data

(60) Provisional application No. 61/417,867, filed on Nov. 29, 2010, provisional application No. 61/429,435, filed on Jan. 3, 2011, provisional application No. 61/434,430, filed on Jan. 19, 2011, provisional application No. 61/449,043, filed on Mar. 3, 2011, provisional application No. 61/471,685, filed on Apr. 4, 2011.

(51) Int. Cl.
*G01R 31/08*     (2006.01)

(52) U.S. Cl.
USPC ............................. 370/252; 370/401; 709/227

(58) Field of Classification Search
USPC ................. 370/230–231, 328–339, 401, 469; 709/227–229
See application file for complete search history.

(56) References Cited

U.S. PATENT DOCUMENTS

| 6,631,122 | B1 | 10/2003 | Arunachalam et al. |
| 7,477,600 | B1 | 1/2009 | Mor et al. |
| 7,643,442 | B1 | 1/2010 | Calhoun |
| 8,406,137 | B2 * | 3/2013 | Siddam et al. ............... 370/235 |
| 2002/0041590 | A1 | 4/2002 | Donovan |
| 2005/0073997 | A1 | 4/2005 | Riley et al. |
| 2005/0114541 | A1 | 5/2005 | Ghetie et al. |
| 2006/0221830 | A1 | 10/2006 | Hu |
| 2007/0008882 | A1 | 1/2007 | Oran |
| 2007/0189293 | A1 | 8/2007 | Yamada et al. |
| 2007/0218918 | A1 | 9/2007 | Liu et al. |

(Continued)

FOREIGN PATENT DOCUMENTS

| CN | 1515123 | 7/2004 |
| CN | 101039505 | 9/2007 |

(Continued)

OTHER PUBLICATIONS

"Digital cellular telecommunications system (Phase 2+); Universal Mobile Telecommunications System (UMTS); LTE; Cx and Dx interfaces based on the Diameter protocol; Protocol details (3GPP TS 29.229 version 8.11.0 Release 8)", Technical Specification, ETSI TS 129 229, version 8.11.0, 39 pages, Oct. 2010.

(Continued)

*Primary Examiner* — Ricky Ngo
*Assistant Examiner* — Iqbal Zaidi
(74) *Attorney, Agent, or Firm* — Perkins Coie LLP

(57) ABSTRACT

A wireless communication apparatus is operable in a first wireless communications system implementing a first wireless communications protocol. A subscriber Quality of Service (QoS) profile module is for configuring a QoS Profile. A receiver module is for receiving, over the first wireless network, a QoS Profile Request message. A transmission module is for transmitting a QoS Profile Response message over the first wireless network.

15 Claims, 10 Drawing Sheets

(56) References Cited

U.S. PATENT DOCUMENTS

| | | | |
|---|---|---|---|
| 2008/0037552 A1 | 2/2008 | Dos Remedios et al. | |
| 2008/0130495 A1 | 6/2008 | Dos Remedios et al. | |
| 2009/0040993 A1 | 2/2009 | Kim et al. | |
| 2009/0103454 A1 | 4/2009 | Watanabe et al. | |
| 2010/0095017 A1 | 4/2010 | Ghetie et al. | |
| 2010/0232441 A1 | 9/2010 | Verma et al. | |
| 2011/0128913 A1* | 6/2011 | Chowdhury et al. | 370/328 |
| 2011/0170411 A1* | 7/2011 | Wang et al. | 370/235 |
| 2012/0218924 A1 | 8/2012 | Bhalla | |

FOREIGN PATENT DOCUMENTS

| | | |
|---|---|---|
| CN | 101478474 | 7/2009 |
| EP | 1 312 226 | 5/2009 |
| EP | 2 068 508 | 6/2009 |
| JP | 2007-221352 | 8/2007 |
| JP | 2009-044736 | 2/2009 |
| WO | 02/085055 | 10/2002 |
| WO | 2006/131981 | 12/2006 |
| WO | 2008/157423 | 12/2008 |
| WO | 2010/086029 | 8/2010 |

OTHER PUBLICATIONS

"Mobile IPv6 Enhancements", 3GPP2 X.S0047-0, version 1.0, 33 pages, Feb. 2009.

Ahmed, T., et al., "End-to-end quality of service provisioning through an integrated management system for multimedia content delivery," Computer Communications, 30(3):638-651, Feb. 2007.

European Search Report dated Jun. 1, 2012 for European Patent Application No. 11275151.6 (13 pages).

Office Action dated Aug. 23, 2013 for Korean Patent Application No. 10-2011-0125588 (11 pages).

Office Action dated Mar. 26, 2013 for Japanese Patent Application No. 2011-258956 (9 pages).

Office Action dated Nov. 4, 2013 for Chinese Patent Application No. 201110388571.3 (11 pages).

Office Action dated Aug. 15, 2013 for Russian Patent Application No. 2011148333 (7 pages).

* cited by examiner

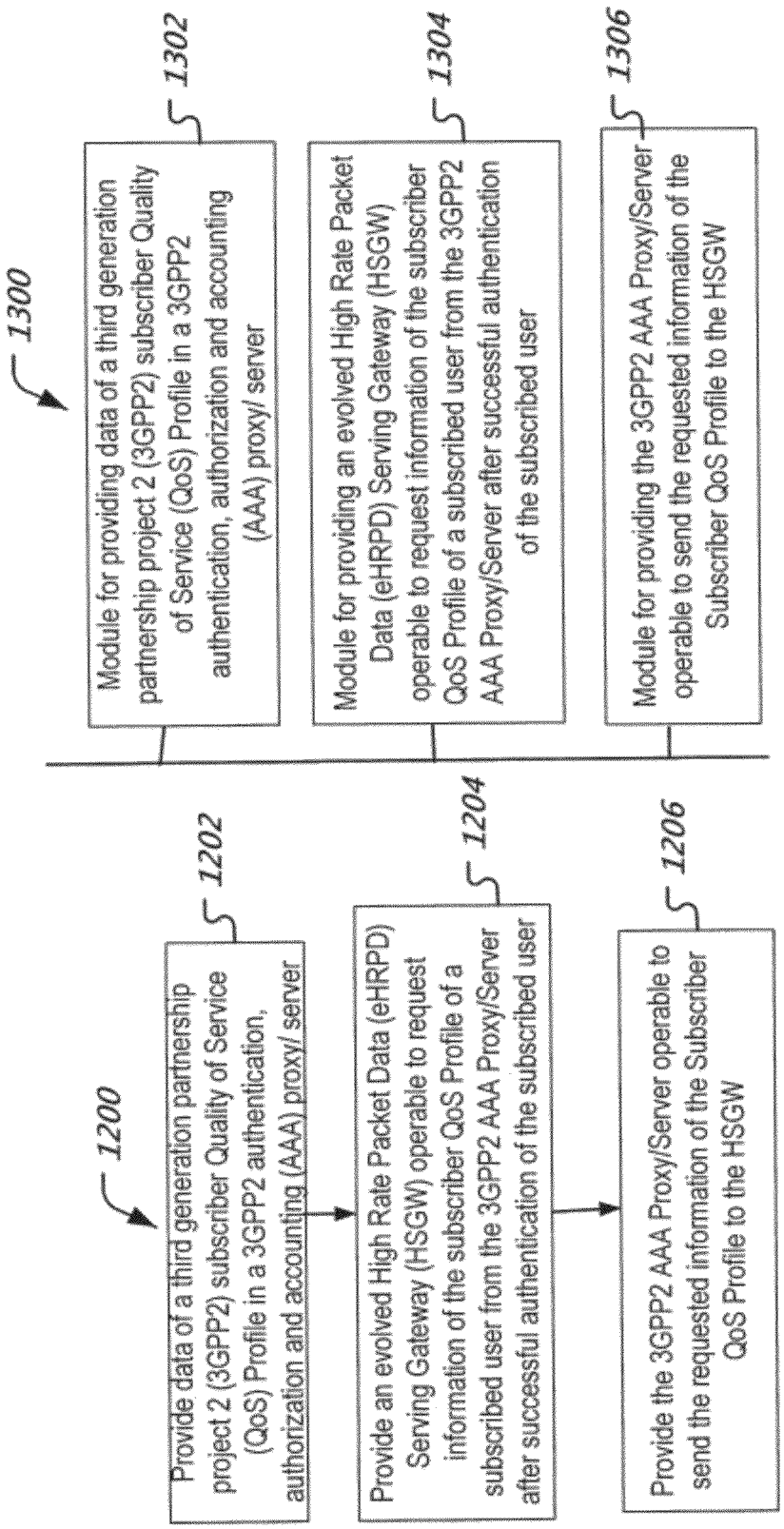

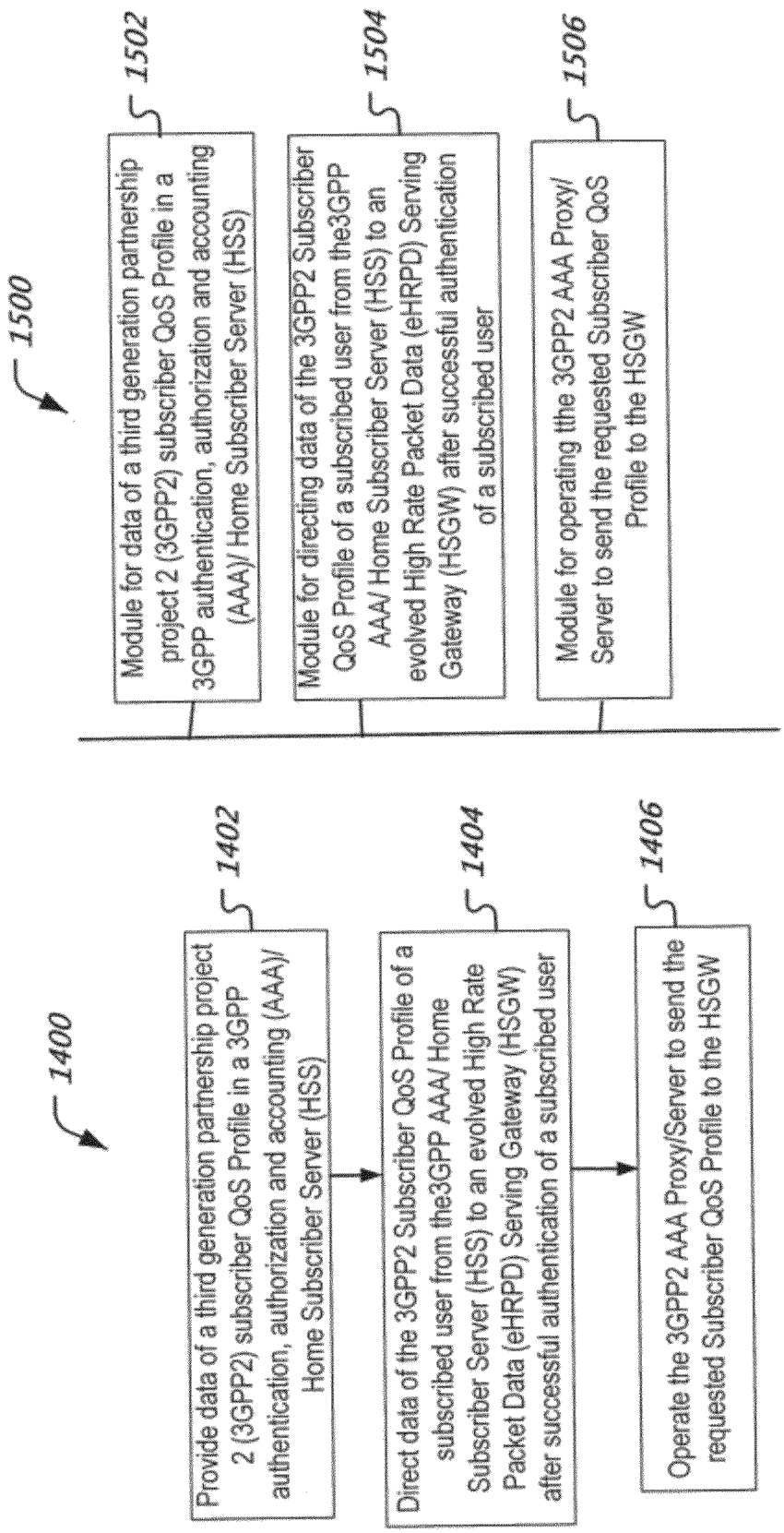

METHODS AND APPARATUS FOR CONFIGURING SUBSCRIBER QUALITY OF SERVICE PROFILES

CROSS REFERENCE TO RELATED APPLICATIONS

This patent document claims the benefit of priority of U.S. Provisional Patent Application No. 61/417,867, entitled "Configuring Subscriber QOS Profile in EHPRD System", filed on Nov. 29, 2010; U.S. Provisional Patent Application No. 61/429,435, entitled "Configuring Subscriber QOS Profile in EHPRD System—Part 2", filed on Jan. 3, 2011; U.S. Provisional Patent Application No. 61/434,430, entitled "Configuring Subscriber QOS Profile in EHPRD System—Part 3", filed on Jan. 19, 2011; U.S. Provisional Patent Application No. 61/449,043, entitled "Configuring Subscriber QOS Profile in EHPRD System—Part 4", filed on Mar. 3, 2011; and U.S. Provisional Patent Application No. 61/471,685, entitled "Configuring Subscriber QOS Profile in EHPRD System—Part 5", filed on Apr. 4, 2011. The entire content of the above referenced patent application is incorporated by reference as a part of this patent document.

BACKGROUND

This patent document relates to wireless communications in wireless communication systems.

In packet switched networks where data packets are delivered via wired or wireless communication links or networks, the quality of service (QoS) is implemented to reserve communication resources and to control delivery of data packets to achieve a certain level of performance in delivering the data packets. The level of the QoS performance can be measured by one or more parameters, e.g., the transmission bit rate, the transmission delay, the packet data jitter, the probability of loss of data, the bit error rate. Certain data services may be tolerant to delays and packet drops while certain data services, such as voice over IP, interactive data services, video and multimedia data services, can be highly sensitive to delays and packet drops and thus require a high level of QoS.

QoS mechanisms can be implemented for controlling and managing packet delivery via wired or wireless communication links or networks based on packet switching to meet certain QoS requirements. Wireless communication systems can include a network of one or more base stations to communicate with one or more wireless devices such as a mobile device, cell phone, wireless air card, mobile station (MS), user equipment (UE), access terminal (AT), or subscriber station (SS). Each base station can emit radio signals that carry data such as voice data and other data content to wireless devices. A base station can be referred to as an access point (AP) or access network (AN) or can be included as part of an access network. Further, wireless communication systems communicate with each other or with wireline communication systems via one or more core networks. A wireless device can use one or more different wireless technologies for communications. Various wireless technologies examples include Code Division Multiple Access (CDMA) such as CDMA2000 1x, High Rate Packet Data (HRPD), Global System for Mobile communications (GSM) based technologies, Long-Term Evolution (LTE), orthogonal frequency-division multiplexing (OFDM), and Worldwide Interoperability for Microwave Access (WiMAX). In some implementations, a wireless communication system can include multiple networks using different wireless technologies.

Techniques are needed for such QoS configurations.

SUMMARY

This document describes technologies, among other things, for wireless communications, such as.

In one aspect, a wireless communications apparatus operable in a first wireless communications system implementing a first wireless communications protocol is disclosed. The apparatus comprises a subscriber Quality of Service (QoS) profile module for configuring a QoS profile, a receiver module for receiving, over the first wireless network, a QoS profile request message; and a transmission module for transmitting a QoS profile response message over the first wireless network.

In another aspect, a wireless communication method is disclosed. The method includes configuring a QoS profile, receiving, over the first wireless network, a QoS profile request message and transmitting a QoS profile response message over the first wireless network.

In yet another aspect, a computer program product is disclosed, having code stored thereupon for configuring a QoS profile, receiving, over the first wireless network, a QoS profile request message and transmitting a QoS profile response message over the first wireless network.

In yet another aspect, an apparatus for, a method of and a computer program product storing instructions for configuring subscriber Quality of Service (QOS) profiles in a wireless network are disclosed. The method includes transmitting a QoS profile request command, receiving a QoS profile response message comprising a result code, and performing a QoS profile configuration action responsive to the result code.

In yet another aspect, an apparatus for, a method of and a computer program product storing instructions for providing data of a third generation partnership project 2 (3GPP2) subscriber Quality of Service (QoS) Profile in a 3GPP2 authentication, authorization and accounting (AAA) proxy/server, providing an evolved High Rate Packet Data (eHRPD) Serving Gateway (HSGW) operable to request information of the subscriber QoS Profile of a subscribed user from the 3GPP2 AAA Proxy/Server after successful authentication of the subscribed user and providing the 3GPP2 AAA Proxy/Server operable to send the requested information of the Subscriber QoS Profile to the HSGW are disclosed.

The details of one or more implementations are set forth in the accompanying attachments, the drawings, and the description below. Other features will be apparent from the description and drawings, and from the claims.

BRIEF DESCRIPTION OF THE DRAWINGS

FIG. 12 is a flowchart representation of a process of wireless communications.

FIG. 13 is a block diagram representation of a portion of a wireless communication apparatus.

FIG. 14 is a flowchart representation of a process of wireless communications.

FIG. 15 is a block diagram representation of a portion of a wireless communication apparatus.

Like reference symbols in the various drawings indicate like elements.

DETAILED DESCRIPTION

In the description below, techniques are provided for wireless communications, in which subscriber Quality of Service (QoS) profiles are shared between two different cellular communications networks. In one aspect, a server within a first wireless communications system is configured to provide subscriber QoS profiles obtained during user authentication in a second wireless communications systems. As further discussed below, the disclosed techniques may be useful in enhancing the operation of various wireless communications devices and servers that support a wireless communications network, such as a gateway server, an authentication, authorization and accounting (AAA) server, and so on. These and other useful aspects of the disclosed techniques are further discussed below.

Figure 1:
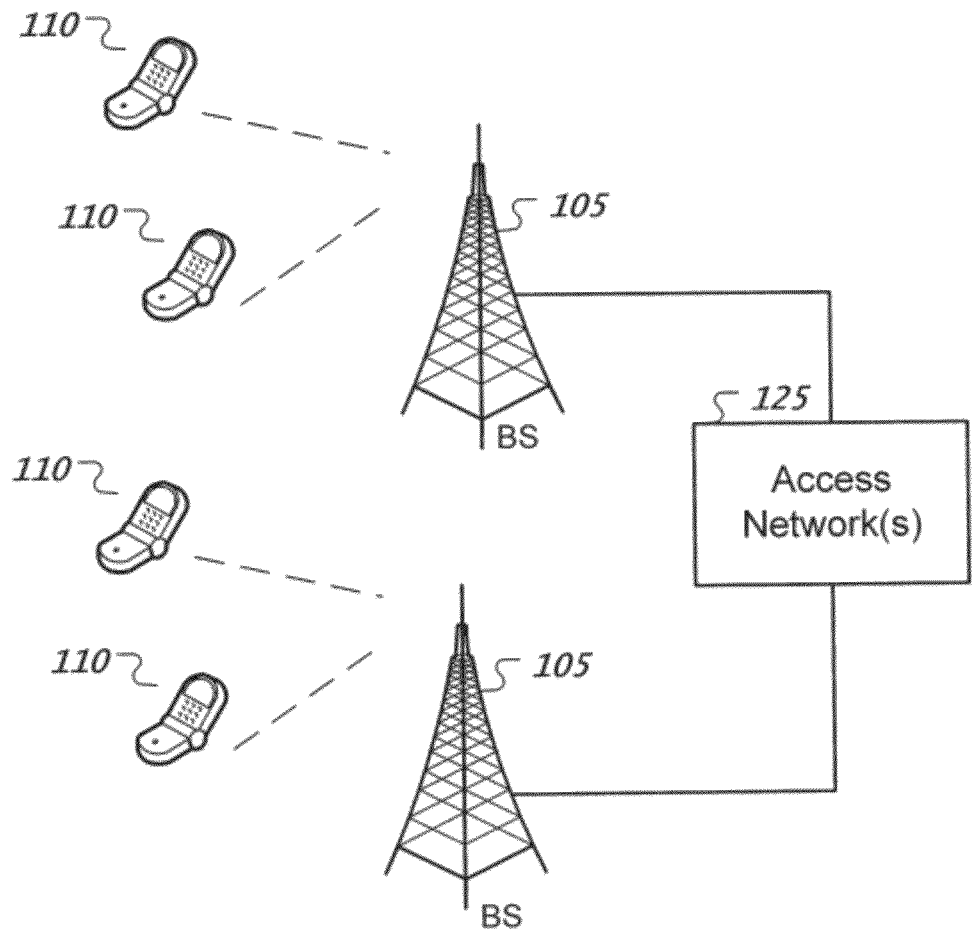
FIG. 1 shows an example of a wireless communication system.

FIG. 1 shows an example of a wireless communication system. A wireless communication system can include one or more base stations (BSs) 105a, 105b, one or more wireless devices 110 and an access network 125. A base stations 105 can provide wireless service to wireless devices 110 in one or more wireless sectors. In some implementations, a base station 105a, 105b includes directional antennas to produce two or more directional beams to provide wireless coverage in different sectors.

The access network 125 can communicate with one or more base stations 105, 105b. In some implementations, the access network 125 includes one or more base stations 105, 105b. In some implementations, the access network 125 is in communication with a core network (not shown in FIG. 1) that provides connectivity with other wireless communication systems and wired communication systems. The core network may include one or more service subscription databases to store information related to the subscribed wireless devices 110. A first base station 105 can provide wireless service based on a first radio access technology, whereas a second base station 105 can provide wireless service based on a second radio access technology. The base stations 105 may be co-located or may be separately installed in the field according to the deployment scenario. The access network 125 can support multiple different radio access technologies.

Various examples of wireless communication systems and access networks that can implement the present techniques and systems include, among others, wireless communication systems based Code Division Multiple Access (CDMA) such as CDMA2000 1x, High Rate Packet Data (HRPD), evolved HRPD (eHRPD), Universal Mobile Telecommunications System (UMTS), Universal Terrestrial Radio Access Network (UTRAN), Evolved UTRAN (E-UTRAN), Long-Term Evolution (LTE), and Worldwide Interoperability for Microwave Access (WiMAX). In some implementations, a wireless communication system can include multiple networks using different wireless technologies. A dual-mode or multi-mode wireless device includes two or more wireless technologies that could be used to connect to different wireless networks. In some implementations, a wireless device can support Simultaneous Voice-Data Operation (SV-DO).

Figure 2:
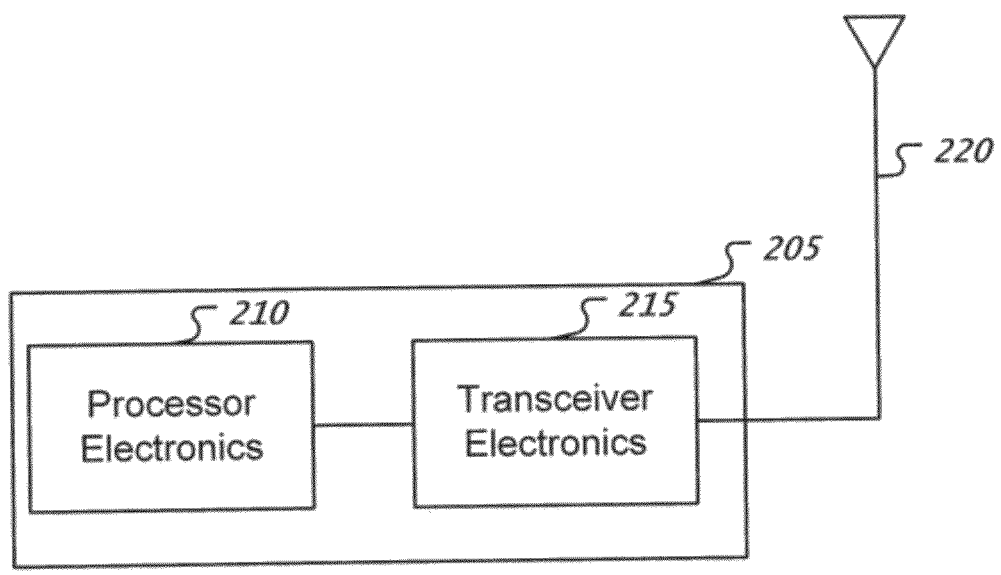
FIG. 2 shows an example of a radio station architecture.

FIG. 2 is a block diagram representation of a portion of a radio station 205. A radio station 205 such as a base station or a wireless device can include processor electronics 210 such as a microprocessor that implements one or more of the wireless techniques presented in this document. The radio station 205 can include transceiver electronics 215 to send and/or receive wireless signals over one or more communication interfaces such as antenna 220. The radio station 205 can include other communication interfaces for transmitting and receiving data. Radio station 205 can include one or more memories configured to store information such as data and/or instructions. In some implementations, the processor electronics 210 can include at least a portion of the transceiver electronics 215.

Figure 3:
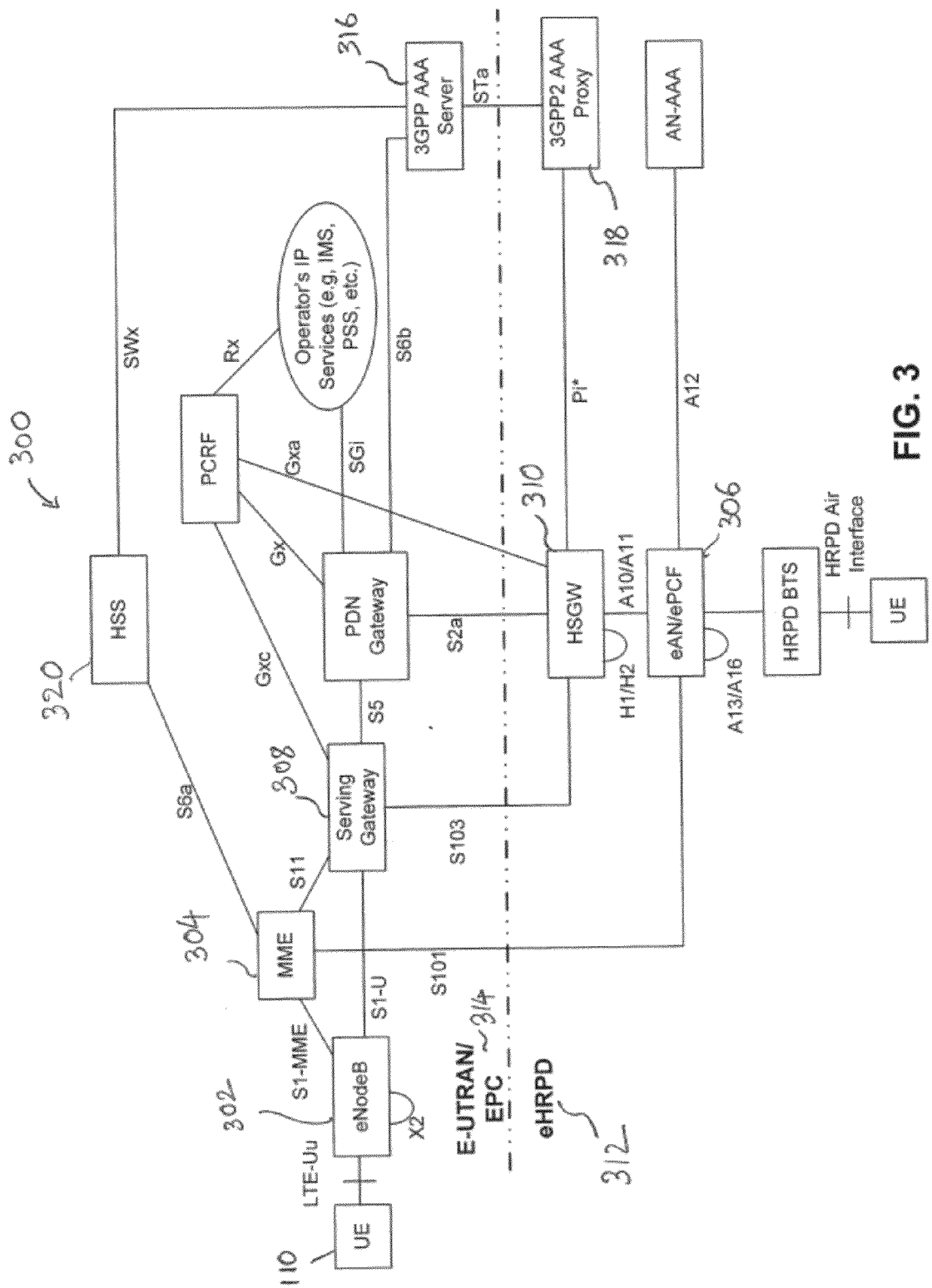
FIG. 3 is a block diagram representation of a non-roaming interworking architecture.

FIG. 3 shows an example of architecture for interworking between the 3GPP Evolved Universal Terrestrial Radio Access Network (E-UTRAN) and the 3GPP2 evolved High Rate Packet Data (eHRPD) network. E-UTRAN is also known as Long Term Evolution (LTE). This architecture supports the interworking interfaces defined in TS 23.402 3GPP: TS 23.402: Architecture Enhancements for non-3GPP Accesses, including S101 and S103 interfaces. S101 is the signaling interface between the EPC Mobility Management Entity (MME) and the evolved HRPD Access Network (eAN/ePCF) (3GPP: TS 29.276: Optimized Handover Procedures and Protocols Between E-UTRAN Access and cdma2000 HRPD Access—Stage 3). Note that the eAN/ePCF functions are defined in A.S0022-0 (3GPP2: A.S0022-0: E-UTRAN-HRPD Connectivity and Interworking: Access Network Aspects (E-UTRAN-HRPD IOS)). S103 is the bearer interface between the Evolved Packet Core (EPC) Serving Gateway (S-GW) and the evolved High Rate Packet Data (eHRPD) Serving Gateway (HSGW) (ref. 3GPP TS 29.276). The eHRPD network provides an IP environment that supports attachment to multiple Packet Data Networks (PDNs) and allocation of IPv4 address or IPv6 address or both IPv4 and IPv6 addresses for each PDN via the 3GPP Evolved Packet Core (EPC). The eHRPD user equipment (UE) 110 uses network based mobility and relies on the use of Proxy Mobile IPv6 (PMIPv6) within the network for mobility management. The HSGW is the HRPD Serving Gateway that connects the evolved HRPD access network with the evolved packet core (EPC) as a trusted non-3GPP access network. The UE 110 is in communication with eNodeB 302 over a wireless protocol such as the LTE wireless protocol.

Figure 4:
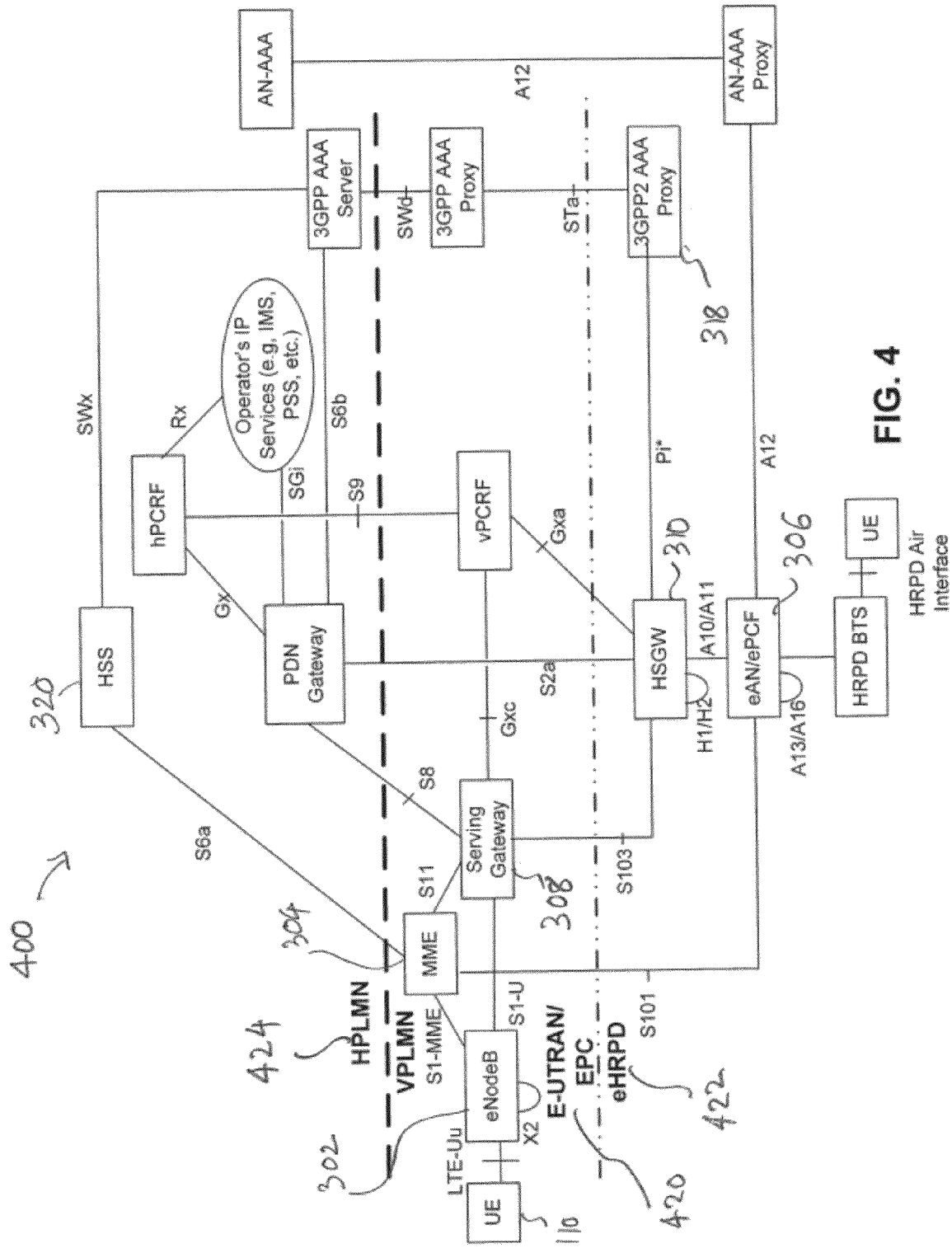
FIG. 4 is a block diagram representation of a roaming interworking architecture.

FIG. 4 illustrates the E-UTRAN-eHRPD interworking roaming architecture for home-routed traffic. In this case the anchor point (i.e., the P-GW 710) is located in the home network. The wireless network 400 also comprises a home public land mobile network (HPLMN) 424 and a visited PLMN (VPLMN). FIG. 4 also depicts E-UTRAN/EPC 420 and eHPRD 422, with UEs 110 being in mobile communications with corresponding eNodeB 302 and HRPD base station (BTS).

Figure 5:
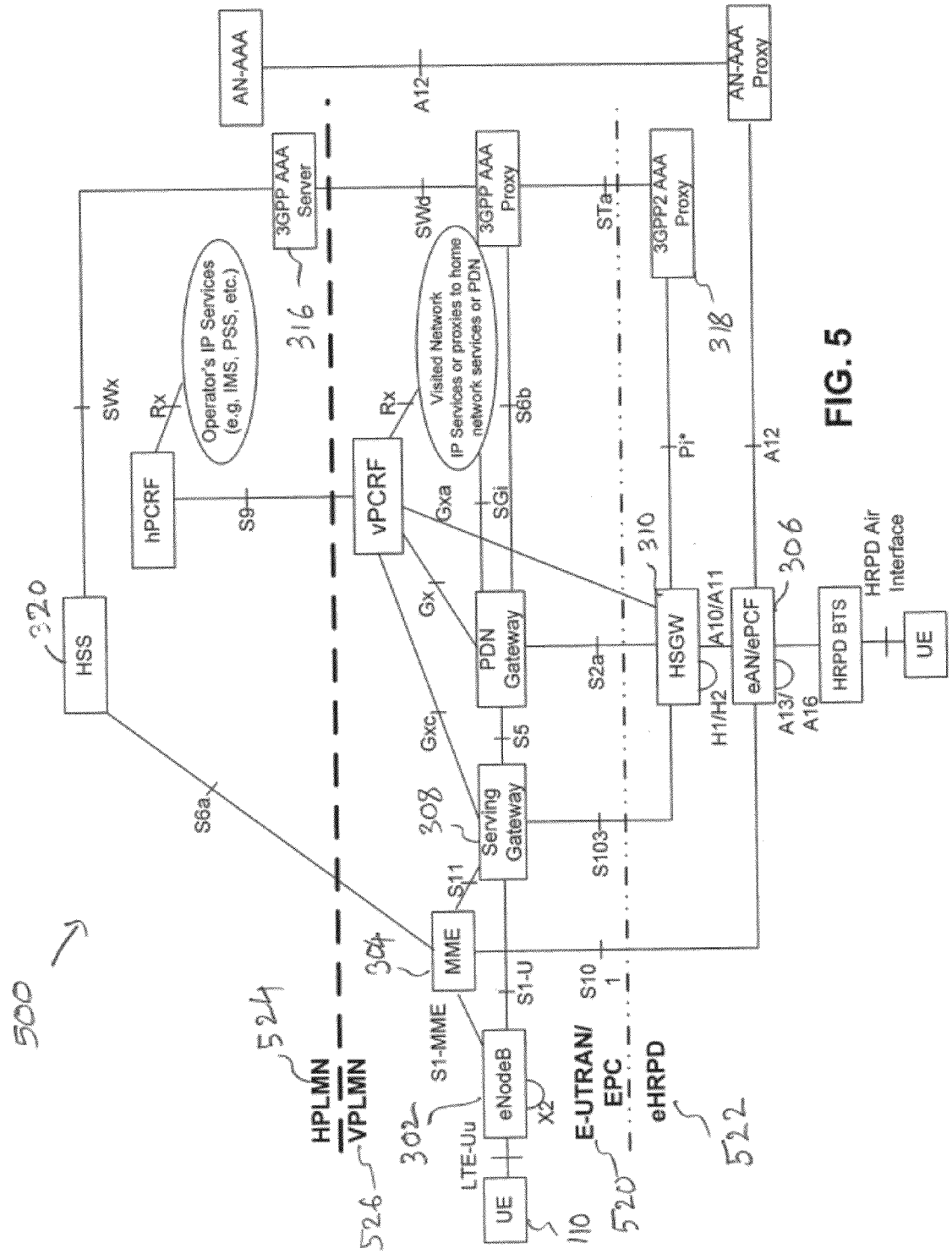
FIG. 5 is a block diagram representation of another roaming interworking architecture.

FIG. 5 illustrates the E-UTRAN-eHRPD interworking roaming architecture for local breakout traffic. In this case the anchor point (i.e., the P-GW 710) is located in the visited network. The wireless communications network 500 also includes HPLMN 500, VPLMN 526. E-UTRAN/EPC 520 and eHRPD 522 networks, with various devices of these networks interworking, as depicted in FIG. 5.

As shown in wireless networks 300, 400 and 500 in FIGS. 3, 4 and 5 respectively, for the interworking between E-UTRAN and eHRPD, the following reference points may be defined:

H1/H2 Reference Points: The H1 reference point may carry signaling information between a source HSGW (S-HSGW) and a target HSGW (T-HSGW) for optimized inter-HSGW handoff.

The H2 reference point may carry user traffic, both uplink and downlink, from a source HSGW (S-HSGW) to a target HSGW (T-HSGW) for optimized inter-HSGW handoff.

Gxa Reference Point: Gxa reference point may connect the Policy and Charging Rules Function (PCRF) 712 in the 3GPP EPC to the BBERF in the HSGW in the 3GPP2 eHRPD access network. Detailed requirements and operation of this interface is defined in 3GPP TS 23.203, TS 29.212 and TS 29.213 specifications.

Pi* Reference Point: The protocol used on the Pi* reference point may connect the HSGW to the 3GPP2 AAA Proxy. The Pi* reference point may be similar to that used on the STa reference point, with additional enhancements as disclosed herein.

S101 Reference Point: The S101 reference point may connect the MME 304 in the 3GPP EPS to the eAN/ePCF 306 in the 3GPP2 eHRPD access network per 3GPP2 A.S0022-0. This reference point may provide tunneling of signaling and data between the UE 110 and the target access network via the source/serving access network. The detailed operation of this interface is defined in 3GPP TS 23.402 and TS 29.276 specifications.

S103 Reference Point: The S103 reference point may connect the Serving Gateway (S-GW) 308 in the 3GPP EPC to the HSGW in the 3GPP2 eHRPD network. Its function is to forward downlink data between the S-GW 308 and the HSGW to minimize packet losses in mobility from E-UTRAN to eHRPD. Detailed requirements and operation of this interface is defined in 3GPP TS 23.402 and TS 29.276 specifications.

S2a Reference Point: The S2a reference point may connect the PDN Gateway in the 3GPP EPC to the HSGW in the 3GPP2 eHRPD network. This reference point provides the user plane with related control and mobility support between eHRPD access and the P-GW. Detailed requirements and operation of this interface is defined in 3GPP TS 23.402, TS 29.275 specifications.

STa Reference Point: The STa reference point may connect the AAA server/proxy in the 3GPP EPC to the AAA proxy in the 3GPP2 eHRPD network. This reference point is used to authenticate and authorize the UE 110 and carries PMIPv6 mode related Diameter parameters between the 3GPP AAA server/proxy 316 and the 3GPP2 AAA proxy 318. Detailed requirements and operation of this interface is defined in 3GPP TS 23.402 and TS 29.273 specifications.

Various entities in FIGS. 3, 4 and 5 may include the following functionalities.

eAN/ePCF 306: eAN/ePCF includes a logical entity in the Radio Access Network (RAN) used for radio communications with the UE 110 and an evolved Packet Control Function entity (ePCF) that manages the relay of packets between the eAN and the HSGW.

Evolved HRPD (eHRPD) 312: The eHRPD network supports attachment to the EPC (evolved packet core) of 3GPP. The eHRPD network optionally supports seamless handoffs between E-UTRAN and evolved HRPD with single-radio terminals.

EPC: The evolved packet core: The EPC architecture is defined in 3GPP TS 23.401 and TS 23.402 specifications.

EPS 314: The evolved packet system is defined in 3GPP TS 23.003, TS 23.401, and TS 23.402 specifications. It consists of the EPC plus the E-UTRAN.

HSGW 310: The HSGW is the HRPD Serving Gateway that connects the evolved HRPD access network with the evolved packet core (EPC) as a trusted non-3GPP access network. The HSGW provides the PMIPv6 mobile access gateway (MAG) function to support layer 3 mobility with the P-GW (LMA).

Inter-HSGW Mobility with Context Transfer: Inter-HSGW mobility with context transfer occurs when a source HSGW transfers context for a UE 110 to a target HSGW using the H1 interface, including the use of the H2 interface for data packet forwarding.

Inter-HSGW Mobility without Context Transfer: Inter-HSGW mobility without context transfer occurs if there is no H1/H2 connectivity between the source HSGW and target HSGW, or if for some reason the context transfer signaling exchange fails.

Legacy AT: A legacy AT is defined as an AT that is compliant to 3GPP2 X.S0011 specifications. A legacy AT cannot communicate properly with an HSGW as defined in this specification. Within this specification, the use of "AT" implies a legacy AT or a UE 110 functioning as a legacy AT.

Legacy PDSN: A legacy PDSN is defined as a PDSN that is compliant with 3GPP2 X.S0011 specifications. The use of "PDSN" implies a legacy PDSN.

In the HRPD (High Rate Packet Data) system defined by the 3GPP2, when UE 110 attaches to the network, Subscriber QoS profile is returned to the PDSN during authentication procedure. The PDSN uses some of the attributes from the Subscriber QoS Profile for authorization of A10 connections. The PDSN provides some of the QoS attributes (if available) to the RAN also for QoS request authorization and traffic policing purposes.

The Subscriber QoS Profile has been defined in 3GPP2 X.S0011 (cmda2000 Wireless IP Network Standard) specifications. The Subscriber QoS Profile used in an HRPD system may have the following attributes:

(A) The Maximum Authorized Aggregate Bandwidth for Best-Effort Traffic
(B) The Authorized Flow Profile IDs for each direction
(C) The Maximum per Flow Priority
(D) The Allowed Differentiated Services Markings
(E) The Service Option Profile
(F) The Inter-User Priority for best effort traffic In the eHRPD system specified by 3GPP2 X.S0057-0 (E-UTRAN-eHRPD Connectivity and Interworking: Core Network Aspects) specifications, Policy and Charging Control (PCC) framework is applied for QoS control. PCRF 712 provides QoS policy to the HSGW via the Gxa interface. The X.50057-0 version of specifications describe only <QCI, MBR, GBR> parameters which can map to the Flow Profile IDs at the HSGW. Other QoS attributes defined in the Subscriber QoS Profile in 3GPP2 X.S0011 specifications are also useful for QoS authorization, but it's not clear how to derive such QoS attributes in the implementation of X.50057-0 specifications. For example, as per X.S0011 specifications, the 'Inter-User Priority for best effort traffic' is applied by the operators to differentiate the priority of Best Effort traffic which are used by different users. Similarly, several of the other parameters specified in X.S0011 specifications are also useful, but no framework for derivation of such parameters is available in the X.50057-0 specifications.

Furthermore, implementation of PCC is optional in X.50057-0 specifications, and PCC may not be deployed in the initial deployments of eHRPD systems. For example, operators may upgrade HRPD networks to eHRPD networks without PCC in their first phase network evolution. Therefore, how the HSGW and eAN obtain QoS profile to perform admission control is not clear.

It would be desirable that the Subscriber QoS Profile parameters defined in 3GPP2 X.S0011 specifications are available in eHRPD system also to ensure that HSGW and eAN can perform QoS functions without PCC. In the absence of PCC, the HSGW can be operated to obtain Subscriber QoS Profile when UE 110 is authenticated and the HSGW forwards some QoS parameters from Subscriber QoS Profile to the eAN via A11 signaling messages In general, the HSGW can obtain Subscriber QoS Profile in different ways. In one implementation, the 3GPP2 Subscriber QoS Profile is configured in the 3GPP AAA/HSS (Home Subscriber Server) 320. Such 3GPP2 Subscriber QoS profile is forwarded by the 3GPP AAA to HSGW 310 over STa and Pi* interface when UE 110 is authenticated. The Subscriber QoS Profile may be stored at HSS 320 or 3GPP AAA in 3GPP format or 3GPP2 format. If the Subscriber QoS Profile is stored as 3GPP format, QoS mapping into 3GPP2 format may be performed at 3GPP2 AAA Proxy server or by the HSGW. STa and Pi* interfaces may be enhanced to support the transmission of Subscriber QoS Profile from the 3GPP AAA to the HSGW 310. Such enhancements in 3GPP specifications involve non-3GPP access specific details.

In another implementation, 3GPP2 Subscriber QoS Profile is configured in the 3GPP2 AAA Proxy/Server. Upon successful authentication, or during authentication, of the user, the HSGW 310 requests Subscriber QoS Profile from the 3GPP2 AAA Proxy/Server. Under this implementation, the Pi* reference point is enhanced to support Subscriber QoS profile parameters and such enhancement is limited to the 3GPP2 domain.

Example details for implementing the 3GPP2 Subscriber QoS Profile in the 3GPP2 AAA Proxy/Server which provides the 3GPP2 Subscriber QoS Profile to the HSGW 310 in response to requests from HSGW 310 are as follows:

The Pi* reference point supports the STa Diameter Application as specified by 3GPP TS 29.273. Optionally the Pi* reference point may support Pi* 3GPP2 Diameter Application as specified in this patent document. Both the HSGW 310 and the 3GPP2 AAA Proxy servers are required to support the STa Diameter Application and thus may advertise support for the STa Diameter Application during the Diameter Capability Exchange procedure.

In case the STa Diameter Application is used, the 3GPP2 AAA Proxy server may proxy the messages between the HSGW 310 and the 3GPP AAA server.

An HSGW 310 or 3GPP2 AAA Proxy server that supports 'Subscriber QoS Profile Configuration' procedure advertise support for, e.g., the Pi* 3GPP2 Diameter Application during the Diameter Capability Exchange procedure.

The peers include the Vendor-Specific-Application-Id VSA in the Diameter Capability Exchange Request with the Vendor-Id attribute set to the SMI Network Management Private Enterprise Codes assigned to 3GPP2 (5535) and the Auth-Application-Id set to the Pi* 3GPP2 Diameter Application ID of 'Diameter APPL-ID' as assigned by IANA.

The Pi* 3GPP2 Diameter Application as described in this patent document may be used if both the 3GPP2 AAA Proxy server and the HSGW 310 support it.

Pi*3GPP2 Diameter Application is defined between the HSGW 310 and the 3GPP2 AAA Proxy server as the peer entities. An operator may choose to extend Pi* 3GPP2 Diameter Application between the HSGW 310 and the 3GPP2 AAA Server in the home domain. In the later case, the 3GPP2 AAA Proxy server may act as a proxy agent as specified in RFC3588. As an example, Pi*3GPP2 Diameter Application specifies the following command pair for the support of Subscriber QoS Profile Configuration feature.

TABLE 1

Command Pair for Subscriber QoS Profile Configuration

| Query Profile Request (QPR) | QPR CMDCODE |
| Query Profile Answer (QPA) | QPR CMDCODE |

Query Profile Request/Answer (QPR/QPA) comprises command pair and can be implemented as a set of 'features', with each feature being specified by the use of Supported-Feature AVP. Unique settings of the Feature-List-ID and Feature-List sub AVP pair within the Supported-Features AVP are used to indicate support for a specific feature, with each bit in the Feature-List sub AVP being independent of the others. The QPR/QPA command pair is specified in the ABNF format. For example, 3GPP2-Subscriber QoS Profile Configuration (SubQoSConfig) may be specified for Pi* 3GPP2 Diameter Application.

In some implementations, Subscriber QoS Profile Configuration Procedure utilizes the Supported-Features AVP as follows:

The Supported-Features AVP 'M' bit is set in the 'Request' commands.

The Vendor-Id sub AVP is set to the 3GPP2 SMI Network Management Private Enterprise Code assigned to 3GPP2 (5535).

Feature-List-ID sub AVP is set to a value of '1'.

Feature-List sub AVP has '0' bit of the bit mask set to '1'

As an example, the following table defines the Feature-bit used for the Supported-Features AVP carried in the QPR/QPA commands

TABLE 2

Features of Feature-List-ID1 for the Pi*3GPP2 Diameter Application

| Feature bit | Feature | M/O | Description |
| --- | --- | --- | --- |
| 0 | SubQoSConfig | M | Subscriber QoS Profile Configuration Procedure. This feature allows the configuration of Subscriber QoS Profile in the eHRPD system. The Subscriber QoS Profile is obtained from the 3GPP2 AAA Proxy/Server in the home domain. |

TABLE 2-continued

Features of Feature-List-ID1 for the Pi*3GPP2 Diameter Application

| Feature bit | Feature | M/O | Description |
|---|---|---|---|
| | | | This feature is applicable for the QPR and QPA command pair. If both the HSGW 310 and the 3GPP2 AAA Proxy/Server support Pi*3GPP2 Diameter Application, the HSGW 310 initiates obtaining Subscriber QoS Profile information from the 3GPP2 AAA Proxy/Server in the home domain by sending the Query Profile Request (QPR) command. If the HSGW 310 does not already know if the 3GPP2 AAA Proxy server supports the 'SubQoSConfig' feature, the HSGW 310 includes Supported-Features AVP in the QPR command. The 3GPP2 AAA Proxy/Server responds with Query Profile Answer (QPA) command that includes the complete set of features supported by it in the Supported-Features AVP. If 3GPP2 AAA Proxy/Server supports the Subscriber QoS Profile Configuration procedure and has the Subscriber QoS Profile available; on successful processing of the QPR, the 3GPP2 AAA Proxy/Server returns the Subscriber QoS Profile information also in the QPA command with DIAMETER_SUCCESS result code. |

Feature bit: The number of the bit within the Supported-Features AVP, set to "1".
Feature: A short name that can be used to refer to the bit and to the feature.
M/O: Defines if the implementation of the feature is mandatory ("M") or optional ("O").
Description: A textual description of the feature.

The Query Profile-Request (QPR) command, indicated by the Command-Code field set to QPR CMDCODE and the "R" bit set in the Command Flags field, is sent from the HSGW 310 to the 3GPP2 AAA Proxy/Server.

Example Message Format

```
< Query Profile-Request> ::= < Diameter Header:
QPR CMDCODE , REQ, PXY, Diameter APPL-ID >
< Session-Id >
{Vendor-Specific-Application-Id}
{Auth-Session-State}
{Origin-Host}
{Origin-Realm}
{Destination-Host}
{Destination-Realm}
{User-Name}
* [Supported-Features]
* [AVP]
*[Proxy-Info]
*[Route-Record]
```

The Query Profile-Answer (QPA) command, indicated by the Command-Code field set to QPR CMDCODE and the "R" bit cleared in the Command Flags field, is sent from the 3GPP2 AAA Proxy/Server to the HSGW 310.

Message Format

```
< Query Profile-Answer> ::= < Diameter Header:
QPR CMDCODE, PXY, Diameter APPL-ID >
< Session-Id >
{Vendor-Specific-Application-Id}
[Result-Code]
[Experimental-Result]
{Auth-Session-State}
{Origin-Host}
{Origin-Realm}
{User-Name}
* [Redirect-Host]
* [Supported-Features]
[Allowed-DiffServ-Markings]
[Service-Option-Profile]
[Maximum-Authorized-Aggregate-Bandwidth]
[Authorized-Flow-Profile-IDs-for-the-User]
[Inter-User Priority]
[Max-Per-Flow-Priority]
*[ AVP ]
*[ Failed-AVP ]
```

-continued

```
*[ Proxy-Info ]
*[ Route-Record ]
```

In some embodiments, a subscriber QoS Profile Configuration procedure may be implemented as follows. The procedures may be supported if the HSGW 310 and the 3GPP2 AAA Proxy/Server support Pi*3GPP2 Diameter Application. It is assumed that the deployment of the Pi*3GPP2 Diameter Application will be consistent throughout the operator network.

Subscriber QoS Profile Configuration procedure may be mapped to the commands pair Query Profile Request/Answer (QPR/QPA) defined for the Pi* 3GPP2 Diameter Application. Appropriate settings of the Supported-Features AVP within the QPR command is used to query the Subscriber QoS Profile Configuration information.

Subscriber QoS Profile Information Retrieval—During Authentication

Figure 6:
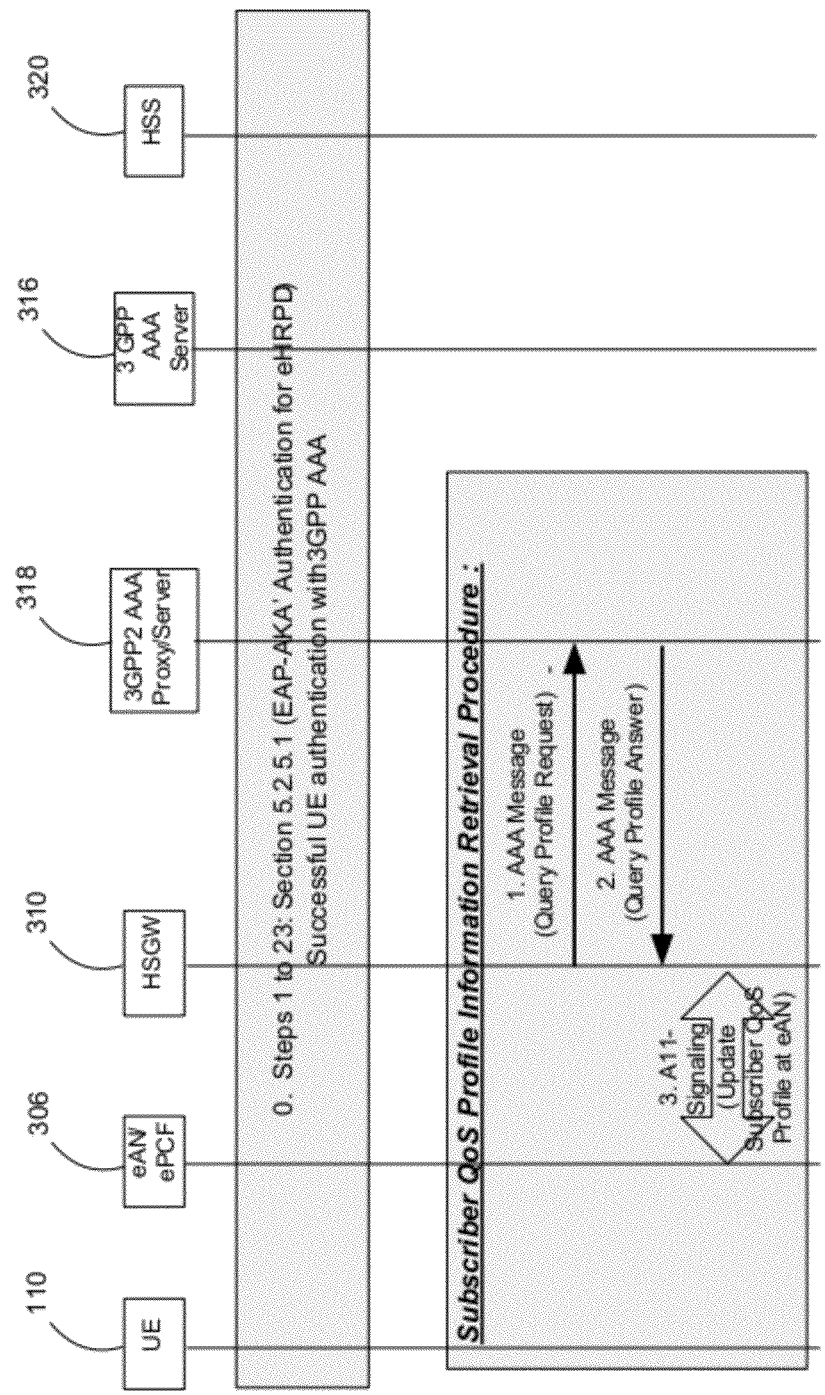
FIG. 6 is a signal exchange diagram representing example messages exchanged for retrieval of subscriber QoS profile information during authentication.

FIG. 6 shows Subscriber QoS Profile information retrieval procedure during UE 110 authentication. The UE 110 performs authentication with the 3GPP AAA using EAP-AKA' via the 3GPP2 AAA Proxy and the authenticator in the HSGW 310. In some implementations, after successful authentication, the HSGW 310 initiates the Subscriber QoS Profile information retrieval procedure with the 3GPP2 AAA Proxy/Server. In some implementations, on validation of such a request for Subscriber QoS Profile information from the HSGW 310, the 3GPP2 AAA Proxy/Server returns Subscriber QoS Profile information to the HSGW 310, if available, over the Pi* reference point.

User is authenticated with the 3GPP AAA as per EAP-AKA' authentication procedures. For example, steps 1-23, section 5.2.5.1 of X.50057-A specifications are successfully completed.

The HSGW 310 invokes Subscriber QoS Profile Configuration procedure by sending Query Profile Request (QPR) command to the 3GPP2 AAA Proxy/Server. If the HSGW 310 does not know if the 3GPP2 AAA Proxy/Server supports SubQoSConfig procedure, it includes Supported-Features AVP with Feature-List-ID AVP set to '1' and feature bit '0' in Feature-List AVP set to '1'. The HSGW 310 uses this procedure to retrieve Subscriber QoS Profile information from the 3GPP2 AAA Proxy/Server.

On successful processing of the Query Profile Request (QPR) command, the 3GPP2 AAA Proxy/Server responds with a Query Profile Answer (QPA) command with Result Code success (DIAMETER_SUCCESS) that includes the Subscriber QoS Profile information, to the HSGW 310. If Supported-Features AVP is included in the QPR command, the Supported-Features AVP is also included indicating the complete set of features supported by the 3GPP2 AAA Proxy/Server. The 3GPP2 AAA Proxy/Server uses IMSI-based Network Access Identifier (NAI) as the key to the subscriber profile information.

If the HSGW 310 receives the Subscriber QoS Profile information from the 3GPP2 AAA Proxy/Server, it forwards Subscriber QoS Profile information elements to the eAN/ePCF via A11-Session Update procedures.

Figure 7:
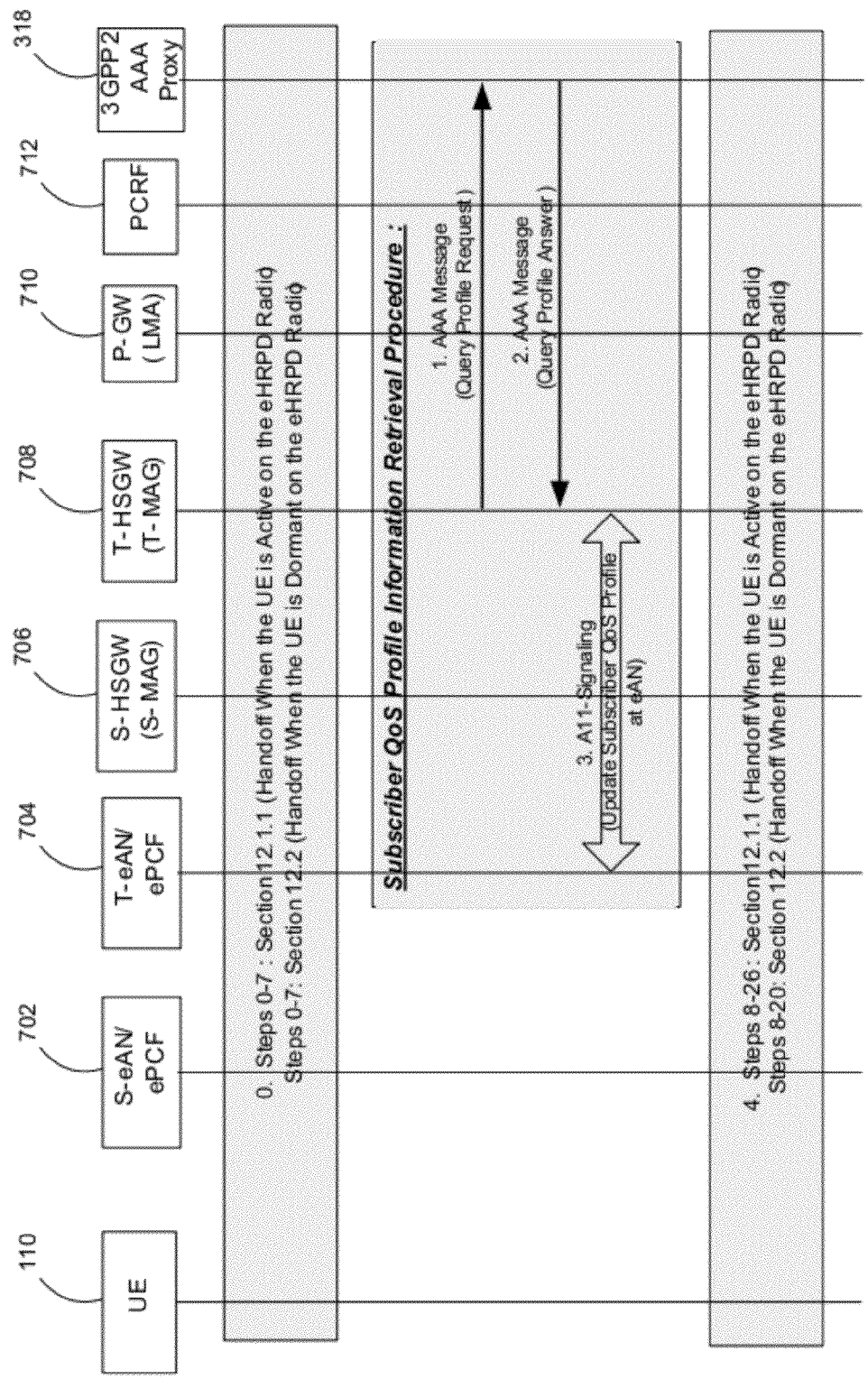
FIG. 7 is a signal exchange diagram representing example messages exchanged for retrieval of subscriber QoS profile information during handoff.

Subscriber QoS Profile Information Retrieval—Intra-eHRPD Handoff with HSGW Relocation with Context Transfer With reference to FIG. 7, during intra-eHRPD handoff with HSGW 310 relocation with context transfer, Subscriber QoS Profile Information context is not transferred from the source HSGW (S-HSGW) 706 to the target HSGW (T-HSGW) 708. The T-HSGW performs Subscriber QoS Profile Information retrieval procedures with the 3GPP2 AAA Proxy/Server 318 after receiving H1-Ack message from the S-HSGW 706.

This example procedure assumes that the deployment of Subscriber QoS Profile Configuration feature is consistent throughout the operator network.

Assuming that the UE 110 has an active session with the P-GW via the S-eAN/ePCF and the S-HSGW 706. The UE 110 or the S-eAN 702 decides that the UE 110 moves to the T-eAN 704. eHRPD radio session context is transferred to the T-eAN including the H1 address of the S-HSGW. The T-eAN/ePCF sets up the A10 connection with the selected T-HSGW 708. The T-HSGW 708 performs the Handover Initiate procedures with the S-HSGW over the H1 Interface, and the S-HSGW responds with Handover Ack that contains the user session context parameters. Context parameters related to the Subscriber QoS Profile are not transferred from the S-HSGW 706 to the T-HSGW 708. Section 12.1.1 of the 3GPP2 X.S0057A document steps 0-7, and section 12.2 of the 3GPP2 document X.50057-A steps 0-7 illustrate the above stated procedure.

The T-HSGW invokes the Subscriber QoS Profile Configuration procedure by sending the Query Profile Request (QPR) command to the 3GPP2 AAA Proxy/Server. If the HSGW does not know if the 3GPP2 Proxy/Server supports the Sub-QoSConfig feature, it includes Supported-Features AVP with Feature-List-ID AVP set to '1' and feature bit '0' in Feature-List AVP set to '1'. The T-HSGW uses this procedure to retrieve the 3GPP2 Subscriber QoS Profile information from the 3GPP2 AAA Proxy/Server.

On successful processing of the Query Profile Request (QPR) command, the 3GPP2 AAA Proxy/Server responds with a Query Profile Answer (QPA) command to the T-HSGW with Result Code success (DIAMETER_SUCCESS) that includes the 3GPP2 Subscriber QoS Profile information to the T-HSGW. If Supported-Features AVP is included in the QPR command, Supported-Features AVP is included in the QPA command also, indicating the complete set features supported by the 3GPP2 AAA Proxy/Server. The 3GPP2 AAA Proxy/Server uses the IMSI-based Network Access Identifier (NAI) as the key to the subscriber profile information.

If the T-HSGW receives the 3GPP2 Subscriber QoS Profile information from the 3GPP2 AAA Proxy/Server, it forwards the Subscriber QoS Profile information elements to the T-eAN/ePCF via A11-Session Update procedures.

In some implementations, the remainder of the handoff procedure continues, e.g., per sections 12.1.1 and 1.2 of the 3GPP2 X.50057-A specification.

Subscriber QoS Profile Configuration procedure is initiated by the HSGW; and the 3GPP2 AAA Proxy/Server responds with the Subscriber QoS Profile information, if available. As specified in X.S0011, the following attributes of Subscriber QoS Profile may be sent to the eAN/ePCF:

Maximum Authorized Aggregate Bandwidth for Best-Effort Traffic

Authorized Flow Profile IDs for Each Direction

Maximum per Flow Priority

Service Option Profile

Inter-User Priority for Best Effort Traffic

In some implementations, the handling and usage of the Subscriber QoS Profile attributes at the HSGW are described in Table 7 and may be performed as disclosed in this patent document. In some implementations, the HSGW stores the Subscriber QoS Profile attributes.

Table 3 provides an example of the information elements supported in the Query Profile Request command.

TABLE 3

Example Information Elements in Query Profile Request command

| Information Element Name | Mapping to Diameter AVP | Cat. | Description |
| --- | --- | --- | --- |
| User Identity (IMSI) | User-Name (ref IETF RFC 3588) | M | This information element contains the user IMSI, formatted according to 3GPP TS 23.003 [xx] clause 2.2. |
| Authentication Session State | Auth-Session-State (ref IETF RFC 3588) | M | This information element includes a value of NO_STATE_MAINTAINED. |
| Supported Features | Supported-Features (ref 3GPP TS 29.229) | O | This is a Grouped AVP. Vendor-ID AVP is set to SMI Network Management Private Enterprise Codes assigned to 3GPP2 (5535). Feature-List-ID AVP is set to '1'; and Feature-List AVP has bit '0' set indicating support of 'SubQoSConfig' (Subscriber QoS Profile Configuration) feature. |

Table 4 provides an example of the information elements supported in the Query Profile Answer command.

TABLE 4

Example Information Elements in Query Profile Answer command

| Information Element Name | Mapping to Diameter AVP | Cat. | Description |
| --- | --- | --- | --- |
| Result Code | Result-Code/ Experimental-Result (ref. RFC3588). | M | This information element contains the result of the operation. The Result-Code AVP is used to indicate success or errors as defined in the Diameter Base Protocol [ref RFC3588[xx]]. The Experimental-Result AVP is used for Pi*3GPP2 Diameter Application and associated Subscriber QoS Profile Configuration feature errors. This is a Grouped AVP; and contains 3GPP2 Vendor ID (5535) in the Vendor-ID AVP, and the error code in the Experimental-Result-Code AVP. |
| User Identity (IMSI) | User-Name (ref. RFC 3588) | M | This information element contains the user IMSI, formatted according to 3GPP TS 23.003 [xx] clause 2.2. |
| Authentication Session State | Auth-Session-State (ref. RFC 3588) | M | This information element includes a value of NO_STATE_MAINTAINED. |
| 3GPP2 AAA Server Name | Redirect-Host (ref. RFC 3588) | C | This information element is sent if the Result-Code value is set to DIAMETER_REDIRECT_INDICATION, and contains the Diameter identity of the 3GPP2 AAA Server in the home domain that is currently serving the user. The QPA command contains zero or more occurrences of this information element. |
| Supported Features | Supported-Features (ref. 3GPP TS 29.229) | C | This is a Grouped AVP. Vendor-ID AVP is set to SMI Network Management Private Enterprise Codes assigned to 3GPP2 (5535). Feature-List-ID AVP is set to '1'; and Feature-List AVP has bits set for the complete set of features supported by the 3GPP2 AAA Proxy/Server. |
| Service Option Profile (ref X.S0011) | Service-Option-Profile | O | If the Result-Code is DIAMETER_SUCCESS, this information element may be included. This is a Grouped AVP and indicates the maximum number of allowed link flows and allowed Service Options. |
| Maximum Authorized Aggregate Bandwidth for Best Effort Traffic (ref X.S0011) | Maximum-Authorized-Aggregate-Bandwidth-for-Best-Effort-Traffic | O | If the Result-Code is DIAMETER_SUCCESS, this information element may be included and indicates the maximum bandwidth that may be allocated to a user for best effort traffic. |
| Authorized Flow Profile IDs for the User for Each Direction (ref X.S0011) | Authorized-Flow-Profile-IDs-for-the-User | O | If the Result-Code is DIAMETER_SUCCESS, this information element may be included. This is a Grouped AVP and indicates the Flow Profile IDs that the user is allowed to request in a QoS Sub Blob. |
| Inter User Priority for Best Effort Traffic (ref X.S0011) | Inter-User-Priority | O | If the Result-Code is DIAMETER_SUCCESS, this information element may be included and indicates the inter-user priority that may be assigned to user's packet flow for best effort traffic. |
| Maximum Per Flow Priority (ref X.S0011) | Max-Per-Flow-Priority-for-the-User | O | If the Result-Code is DIAMETER_SUCCESS, this information element may be included and indicates the maximum priority that may be assigned to a user's packet flow. |

In some implementations, if both the HSGW and the 3GPP2 AAA Proxy/Server support Pi* 3GPP2 Diameter Application, and the HSGW needs the Subscriber QoS Profile information, the HSGW initiates Subscriber QoS Profile Configuration procedure by sending Query Profile Request (QPR) command to the 3GPP2 AAA Proxy/Server. If the HSGW does not know if the SubQoSConfig feature is supported by the 3GPP2 AAA Proxy/Server, the QPR command includes Supported-Features AVP with 'M' bit set, Feature-List-ID sub AVP set to '1' and Feature-List sub AVP having bit '0' set indicating request for Subscriber QoS Profile Configuration procedure. The HSGW uses this procedure to retrieve Subscriber QoS Profile information from the 3GPP2 AAA Proxy/Server.

In some implementations, the Subscriber QoS Profile Configuration procedure is a stateless procedure. In some implementations, the HSGW includes Auth-Session-State AVP in Query Profile Request (QPR) command, with value set to NO_STATE_MAINTAINED.

On receiving a Query Profile Answer (QPA) command from the 3GPP2 AAA Proxy/Server, the HSGW may check the Result Code. If the result code indicates other than success (DIAMETER_SUCCESS) the HSGW may take corrective action based on the received result code, On receiving a Query Profile Answer (QPA) command, from the 3GPP2 AAA Proxy/Server, with success (DIAMETER_SUCCESS) Result Code, the HSGW may check for the presence of Subscriber QoS Parameters listed in Table 5; and may handle them as per procedures specified in Table 4.

In some implementations, if a Query Profile Answer (QPA) command is received with the Experimental-Result-Code AVP set to DIAMETER_ERROR_FEATURE_UNSUPPORTED or with the Result-Code AVP set to DIAMETER_AVP_UNSUPPORTED, the HSGW aborts the 3GPP2-Subscriber QoS Profile Configuration procedure.

On receiving the Query Profile Request (QPR) command, the 3GPP2 AAA Proxy/Server may do one of the following:

In some implementations, if it supports all the features indicated in the Supported-Features AVP, the 3GPP2 AAA Proxy/Server includes the Supported-Features AVP in the QPA command, identifying the complete set of features that it supports for the Pi*3GPP2 Diameter Application.

In some implementations, if it does not support all the features indicated in the Supported-Features AVP, the 3GPP2 AAA Proxy/Server returns the QPA command with the Experimental-Result-Code AVP set to DIAMETER_ERROR_FEATURE_UNSUPPORTED and includes the Supported-Features AVP identifying the complete set of features that it supports for the Pi*3GPP2 Diameter Application.

In some implementations, if it does not support the Supported-Features AVP, the QPA command with the Result-Code AVP set to DIAMETER_AVP_UNSUPPORTED is returned and includes a Failed-AVP AVP containing the Supported-Features AVP as received in the QPR command.

In some implementations, if the 3GPP2 AAA Proxy/Server includes the Supported-Features AVP in the Query Profile Answer (QPA) command, the Supported-Features AVP have 'M' bit cleared. In this Grouped AVP, Feature-List-ID sub AVP is set to '1'; and Feature-List sub AVP have bits set for the complete set of features supported by the 3GPP2 AAA Proxy/Server.

In some implementations, if the 3GPP2 AAA Proxy/Server supports the Subscriber QoS Profile Configuration (SubQoSConfig) feature:

It checks whether the User Name (IMSI) in User-Name AVP is known. If it is not known, a Result Code of DIAMETER_ERROR_USER_UNKNOWN is returned.

In some implementations, if the user is known but does not have any Subscriber QoS Profile configured for it, the 3GPP2 AAA Proxy/Server responds with Experimental-Result-Code DIAMETER_ERROR_NO_SUBSCRIBER_QoS_PROFILE.

For any other error, the Result Code DIAMETER_UNABLE_TO_COMPLY may be returned.

In some implementations, the Subscriber QoS Profile Configuration procedure is a stateless procedure. The 3GPP2 AAA Proxy/Server includes Auth-Session-State AVP in the Query Profile Answer (QPA) command, with value set to NO_STATE_MAINTAINED.

In some implementations, if the 3GPP2 AAA Proxy/Server successfully processes the received Query Profile Request (QPR) command, the 3GPP2 AAA Proxy/Server responds with a Query Profile Answer (QPA) command with Result Code success (DIAMETER_SUCCESS) and includes the subscribed QoS information elements as listed in Table 4.

The Result-Code AVP values defined in Diameter Base Protocol RFC 3588 may be applicable.

In some implementations, when one of the result codes defined below is included in an answer command, it is included inside an Experimental-Result AVP with Vendor-ID set to 3GPP2 Vendor-ID (5535).

The Experimental-Result-Code AVP contains the 3GPP2 assigned value representing the result of processing a request command.

DIAMETER_ERROR_FEATURE_UNSUPPORTED (3001): This Experimental Result Code is sent by the 3GPP2 AAA Proxy/Server to the HSGW if it does not support all the features indicated in the Supported-Features AVP.

DIAMETER_ERROR_NO_SUBSCRIBER_ QoS_PROFILE (4001): This Experimental Result Code is sent by the 3GPP2 AAA Proxy/Server to the HSGW if the user is known but it does not have a Subscriber QoS Profile configured for the user.

Table 5 and Table 6 list example Diameter AVPs defined for Subscriber QoS Profile Configuration feature for use in Query Profile Request (QPR) and Query Profile Answer (QPA) commands.

TABLE 5

Diameter AVPs for Subscriber QoS Profile Configuration Feature

| | | | | AVP Flag rules | | | |
| --- | --- | --- | --- | --- | --- | --- | --- |
| Attribute Name | AVP Code | Value Type | Opt | May | Should not | Not | May Encr. |
| Service-Option-Profile | TBD | Grouped | V | M | | | No |
| Max-Authorized-Aggregate-Bandwidth-for-Best-Effort-Traffic | TBD | Unsigned32 | V | M | | | No |
| Authorized-Flow-Profile-IDs-for-the-User | TBD | Grouped | V | M | | | No |
| Inter-User-Priority | TBD | Integer32 | V | M | | | No |
| Max-Per-Flow-Priority-for-the-User | TBD | Integer32 | V | M | | | No |
| ProfileID-Forward | 35 | Integer32 | V | M | | | No |
| ProfileID-Reverse | 36 | Integer32 | V | M | | | No |
| ProfileID-Bi-Directional | 37 | Integer32 | V | M | | | No |

TABLE 5-continued

Diameter AVPs for Subscriber QoS Profile Configuration Feature

| Attribute Name | AVP Code | Value Type | AVP Flag rules | | | | |
| --- | --- | --- | --- | --- | --- | --- | --- |
| | | | Opt | May | Should not | Not | May Encr. |
| Max-Link-Flows | TBD | Unsigned32 | V | M | | | No |
| Service-Option-Number | TBD | Unsigned32 | V | M | | | No |

NOTE:
The AVP header bit denoted as 'M', indicates whether support of the AVP is required.
The AVP header bit denoted as 'V', indicates whether the optional Vendor-ID field is present in the AVP header.
For further details, see IETF RFC 3588.

TABLE 6

Diameter Re-used AVPs for Subscriber QoS Profile Configuration Feature

| Attribute Name | Reference | Comments |
| --- | --- | --- |
| User-Name | RFC3588 | This information element contains the identity of the user. |
| Supported-Features | TS 29.229 | This information element contains the list of features supported by the node originating the command (Origin Host). |
| Feature-List-ID | TS 29.229 | This information element contains the identity of the feature list. |
| Feature-List | TS 29.229 | This information element contains a bit mask indicating the supported features of an application. |

The Service-Option-Profile AVP (AVP code 5535/TBD) is of type Grouped. It specifies the authorized packet data Service Options and the allowed maximum number of simultaneous Link Flows.

In some implementations, the format of the service option profile attribute value pair (AVP) is as follows:

```
Service-Option-Profile ::= < AVP Header: TBD 5535 >
   {Max-Link-Flows}
   *[Service Option Number]
   *[AVP]
```

The Max-Authorized-Aggregate-Bandwidth-for-Best-Effort-Traffic AVP (AVP code 5535/TBD) is of type Unsigned32. It indicates the maximum bandwidth with range 1 to 2**32 (binary value of the maximum allowed aggregate bandwidth, in bits per second) that may be allocated to a user for best-effort traffic.

The Authorized-Flow-Profile-IDs-for-the-User AVP (AVP code 5555/TBD) is a Grouped AVP. It provides the list of Flow Profile IDs that the user is allowed to specify/request in a QoS_Sub_Blob.

In some implementations, the format of the Authorized-Flow-Profile-IDs AVP is as follows:

```
Authorized-Flow-Profile-IDs-for-the-User ::= < AVP Header:
TBD 5535 >
   *[ProfileID-Forward]
   *[ProfileID-Reverse]
   *[ProfileID-Bi-direction]
   *[AVP]
```

The Inter-User-Priority AVP is of type Integer32. It indicates the inter-user priority assigned to the user for best effort traffic. As an example, the low order 3 bits indicate the inter-user priority used for scheduling packets (X.S0011). Priority 7 is the highest and 0 is the lowest.

000-011: Priority 0 to 3 for regular users.

100-111: Priority 4 to 7 for Reserved Class.

The Max-Per-Flow-Priority-for-the-User AVP (AVP code 5535/TBD) is of type Integer32. It indicates the maximum priority that may be assigned to user's packet flow. The low order 4 bits indicate the maximum priority that the user can specify for a packet data flow. Priority 15 is the highest and 0 is the lowest.

0000-0111: Priority 0 to 7 for regular users.

1000-1111: Priority 8 to 15 for Reserved Class.

The ProfileID-Forward AVP (AVP code 5535/35) is of type Integer32. It is used to indicate Flow Profile ID that the user is allowed to request on the forward link. In some implementations, the Flow Profile ID is included in the least significant 16 bits. The most significant 16 bits are set to 0.

The ProfileID-Reverse AVP (AVP code 5535/36) is of type Integer32. It is used to indicate Flow Profile ID that the user is allowed to request on the reverse link. As an example, the Flow Profile ID is included in the least significant 16 bits. The most significant 16 bits are set to 0.

The ProfileID-Bi-Direction AVP is of type Integer32. It is used to indicate Flow Profile ID that the user is allowed to request bi-directionally. As an example, the Flow Profile ID is included in the least significant 16 bits. The most significant 16 bits is set to 0.

The Max-Link-Flows AVP is of type Unsigned32. It indicates the maximum number of link flows that the user is allowed to establish.

The Service-Option-Number AVP is of type Unsigned32. It indicates the Service Option allowed for the user.

In some implementations, when HSGW uses Subscriber-QoSProfile Configuration procedures to retrieve Subscriber QoS Profile information over the Pi* reference point, the following procedures are performed. The HSGW processes SubscriberQoSProfile parameters received from the 3GPP2 AAA Proxy/Server as specified in Table 7 below. The following SubscriberQoSProfile parameters may be applicable to 3GPP2 access network:

Maximum Authorized Aggregate Bandwidth for Best-Effort Traffic

Authorized Flow Profile IDs for Each Direction

Maximum per Flow Priority

Service Option Profile

Inter-User Priority for Best-Effort Traffic

TABLE 7

Example 3GPP2 Access Network QoS Parameters

| 3GPP2 Access Network QoS Parameter | Description |
|---|---|
| Maximum Authorized Aggregate Bandwidth for Best-Effort Traffic | Set to the value in Maximum-Authorized-Aggregate-Bandwidth-for Best-Effort-Traffic AVP received from the 3GPP2 AAA. HSGW forwards Maximum Authorized Aggregate Bandwidth for Best-Effort Traffic parameter, if available, to the eAN/ePCF via A11-Session Update message. |
| Authorized Flow Profile IDs for Each Direction | Set to the value in Authorized-Flow-Profile-ID-for-the-User AVP received from the 3GPP2 AAA Proxy/Server. HSGW forwards Authorized Flow Profile IDs for Each Direction parameter, if available, to the eAN/ePCF via A11-Session Update message. |
| Maximum per Flow Priority | Set to the value in Maximum-Per-Flow-Priority-for-the-User AVP received from the 3GPP2 AAA Proxy/Server. HSGW forwards Maximum per Flow Priority parameter, if available, to the eAN/ePCF via A11-Session Update message. |
| Service Option Profile | Set to the value in Service-Option-Profile AVP received from the 3GPP2 AAA Proxy/Server. HSGW forwards Service Option Profile parameter, if available, to the eAN/ePCF via A11-Session Update message. |
| Inter-User Priority for Best-Effort Traffic | Set to the value in Inter-User-Priority AVP received from the 3GPP2 AAA Proxy/Server. HSGW forwards Inter-User Priority for Best-Effort Traffic parameter, if available, to the eAN/ePCF via A11-Session Update message. |

Figure 8:
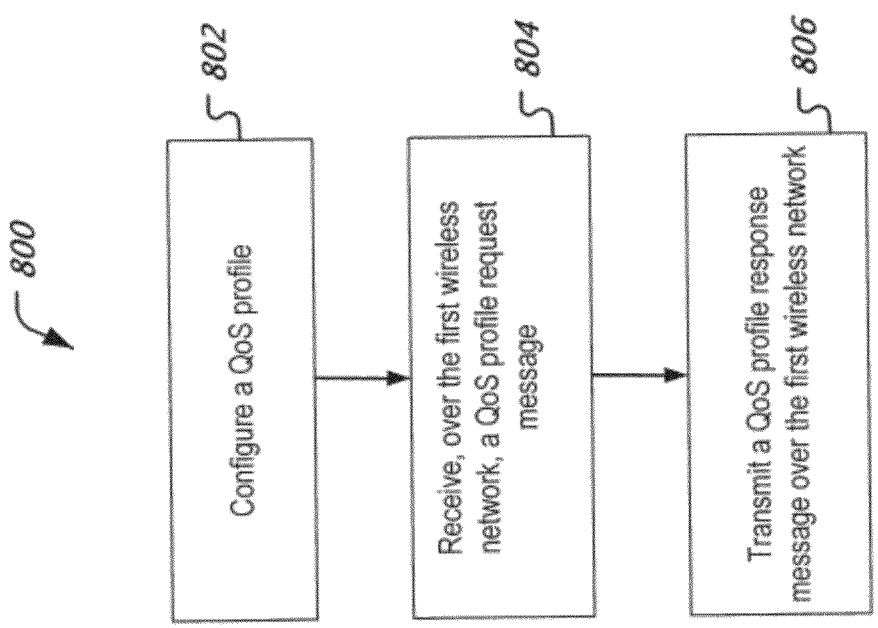
FIG. 8 is a flowchart representation of a process of wireless communications.

FIG. 8 is a flowchart representation of a process 800 of wireless communications. At 802, a QoS Profile is configured. At 804, A QoS profile request message is received over a first wireless network. At 806, a QoS profile response message is transmitted over the first wireless network. In some implementations, a list of supported-feature attribute value pairs (AVPs) may also be received. When all AVPs in the received list are supported, a complete set of supported features may be included in the QoS profile response message.

In some implementations, the process 800 may be implemented at the 3GPP2 AAA Proxy server 318, with the first network being the 3GPP2 network. The 3GPP2 AAA Proxy server 318 may further interface with an AAA server, operable in a second wireless communications system implementing a second wireless communications protocol (e.g., 3GPP), for authenticating a subscriber equipment into the first wireless communications system.

Figure 9:
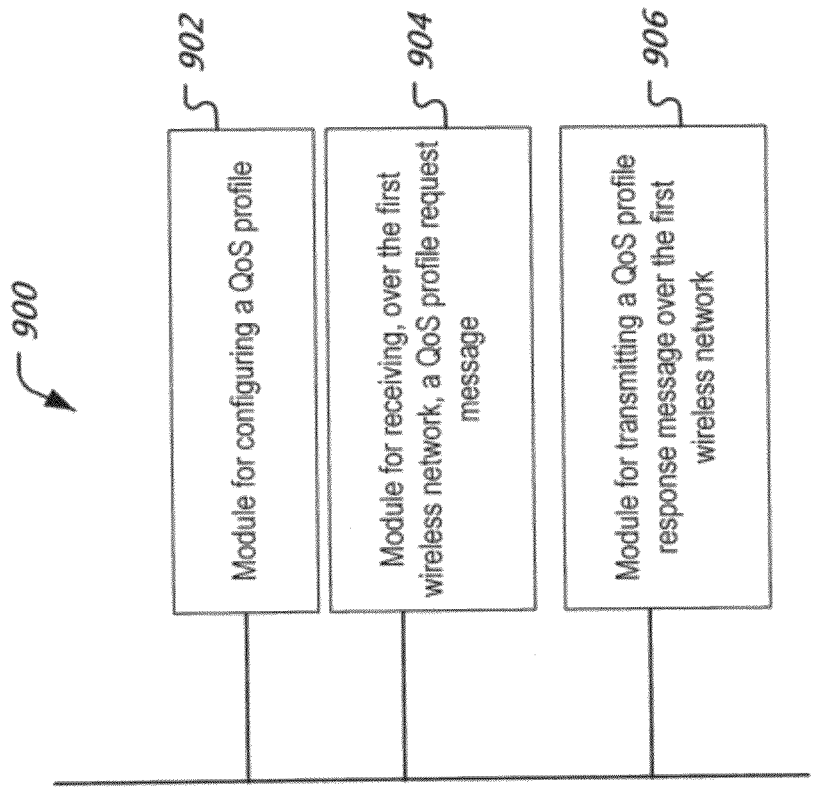
FIG. 9 is a block diagram representation of a portion of a wireless communication apparatus.

FIG. 9 is a block diagram representation of a portion of a wireless communications apparatus 900. The module 902 is for configuring a QoS profile. The module 904 is for receiving, over the first wireless network, a QoS profile request message. The module 906 is for transmitting a QoS profile response message over the first wireless network. The apparatus 900 and modules 902, 904, 906 may further implement various techniques disclosed in this patent document.

Figure 10:
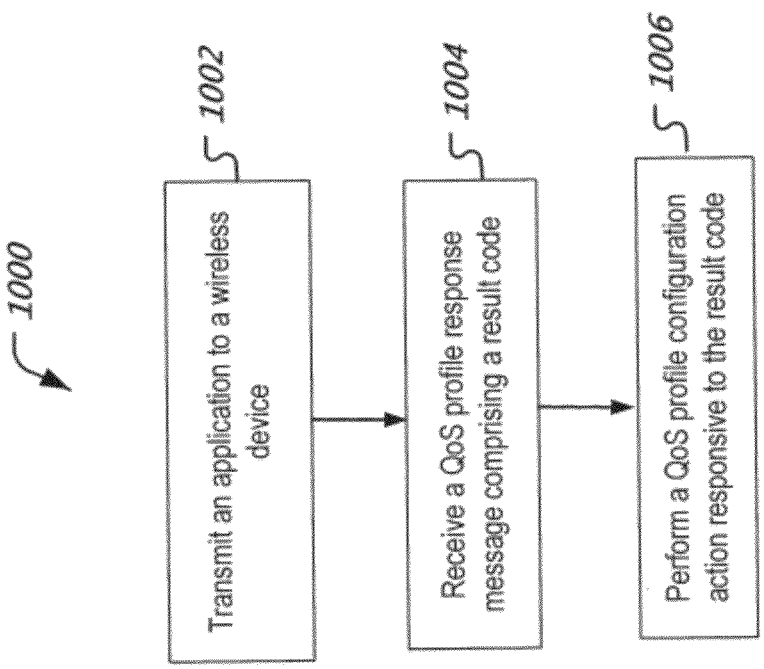
FIG. 10 is a flowchart representation of a process of wireless communications.

FIG. 10 is a flowchart representation of a process 1000 of wireless communications. At 1002, a QoS profile request command is transmitted. At 1004, a QoS profile response message comprising a result code is received. At 1006, a QoS profile configuration action is performed, responsive to the result code. The process 1000 may be performed, for example, at the HSGW 310.

Figure 11:
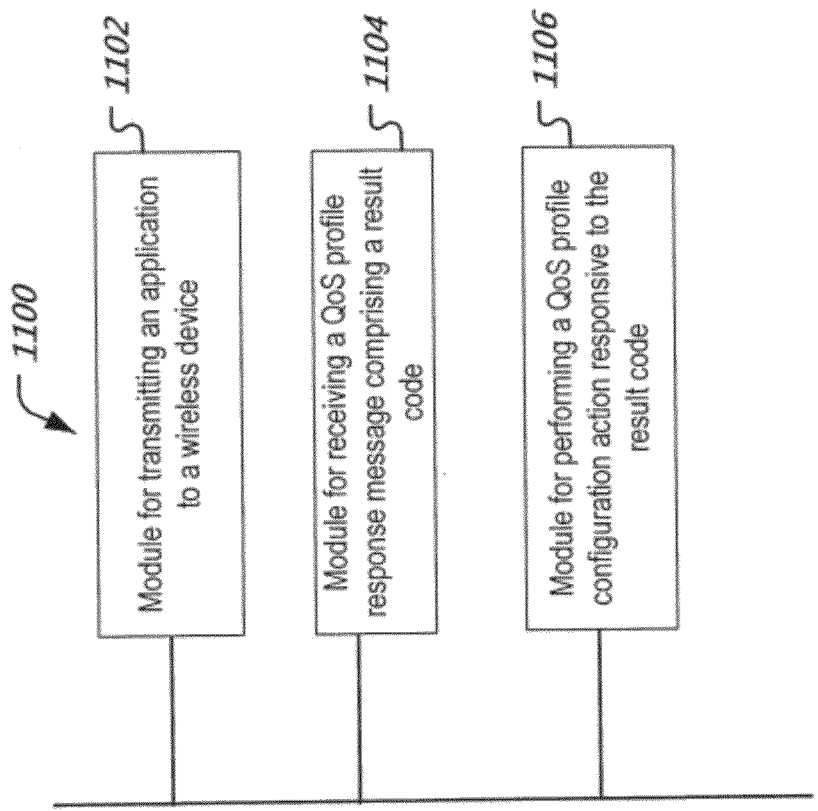
FIG. 11 is a block diagram representation of a portion of a wireless communication apparatus.

FIG. 11 is a block diagram representation of a portion of a wireless communications apparatus 1100. The module 1102 is for transmitting a QoS profile request command. The module 1104 is for receiving a QoS profile response message comprising a result code. The module 1106 is for performing a QoS profile configuration action responsive to the result code. The apparatus 1100 and modules 1102, 1104, 1106 may further implemented certain techniques disclosed in this document.

FIG. 12 is a flowchart representation of a process 1200 of wireless communications for facilitating wireless communications having both evolved universal terrestrial radio access network (E-UTRAN) access and cdma2000 evolved high rate packet data (eHRPD) access. At 1202, data of a third generation partnership project 2 (3GPP2) subscriber Quality of Service (QoS) Profile in a 3GPP2 authentication, authorization and accounting (AAA) proxy/server is provided. At 1204, an evolved High Rate Packet Data (eHRPD) Serving Gateway (HSGW) operable to request information of the subscriber QoS Profile of a subscribed user from the 3GPP2 AAA Proxy/Server after successful authentication of the subscribed user is provided. At 1206, the 3GPP2 AAA Proxy/Server operable to send the requested information of the Subscriber QoS Profile to the HSGW is provided.

FIG. 13 is a block diagram representation of a portion of a wireless communications system 1300 for facilitating wireless communications having both evolved universal terrestrial radio access network (E-UTRAN) access and cdma2000 evolved high rate packet data (eHRPD) access. The module 1302 is for providing data of a third generation partnership project 2 (3GPP2) subscriber Quality of Service (QoS) Profile in a 3GPP2 authentication, authorization and accounting (AAA) proxy/server. The module 1304 is for providing an evolved High Rate Packet Data (eHRPD) Serving Gateway (HSGW) operable to request information of the subscriber QoS Profile of a subscribed user from the 3GPP2 AAA Proxy/Server after successful authentication of the subscribed user. The 3GPP2 AAA Proxy/Server is operable to send the requested information of the Subscriber QoS Profile to the HSGW.

FIG. 14 is a flowchart representation of a process 1400 of wireless communications. At 1402, data of a third generation partnership project 2 (3GPP2) subscriber QoS Profile in a 3GPP authentication, authorization and accounting (AAA)/

Home Subscriber Server (HSS) is provided. At 1404, data of the 3GPP2 Subscriber QoS Profile of a subscribed user from the 3GPP AAA/Home Subscriber Server (HSS) is directed to an evolved High Rate Packet Data (eHRPD) Serving Gateway (HSGW) after successful authentication of a subscribed user. At 1406, the 3GPP2 AAA Proxy/Server is operated to send the requested Subscriber QoS Profile to the HSGW.

FIG. 15 is a block diagram representation of a portion of a wireless communications system 1500 for providing wireless communications having both E-UTRAN Access and cdma2000 eHRPD Access. The module 1502 is for providing data of a third generation partnership project 2 (3GPP2) subscriber QoS Profile in a 3GPP authentication, authorization and accounting (AAA)/Home Subscriber Server (HSS). The module 1504 is for directing data of the 3GPP2 Subscriber QoS Profile of a subscribed user from the 3GPP AAA/Home Subscriber Server (HSS) to an evolved High Rate Packet Data (eHRPD) Serving Gateway (HSGW) after successful authentication of a subscribed user. The module 1506 is for operating the 3GPP2 AAA Proxy/Server to send the requested Subscriber QoS Profile to the HSGW.

It will be appreciated that several techniques are described for providing subscriber QoS profile in a system operational in two different wireless communications networks implementing two different wireless communications protocols.

It will further be appreciated that signals exchanged between 3GPP2 HSGW and 3GPP2 Proxy Server for facilitating subscriber QoS profile query and response are disclosed. I It will further be appreciated that various enhancements for wireless network devices such as 3GPP2 HSGW, 3GPP2 AAA Proxy Server and 3GPP AAA Proxy Server 316 are disclosed to facilitate providing subscriber QoS Profile information between a 3GPP and a 3GPP2 system.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A wireless communications apparatus operable in a first wireless communications system implementing a first wireless communications protocol, comprising:
a configuration module for configuring a QoS profile;
a receiver module for receiving, over the first wireless network, a QoS profile request message; and
a transmission module for transmitting a QoS profile response message over the first wireless network;
wherein the receiver module is further configured to receive a list of supported-features attribute-value pairs (AVPs); and
wherein the transmission module is further configured to, when all AVPs in the received list are supported, include in the QoS profile response message a complete set of features supported; and
when all AVPs in the received list are not supported, include in the QoS profile response message a complete set of features supported and further include set an Experimental-Result-Code AVP set to DIAMETER ERROR FEATURE UNSUPPORTED.

2. The wireless communications apparatus of claim 1, further comprising:
an interface module for interfacing with an authentication, authorization and accounting (AAA) server, operable in a second wireless communications system implementing a second wireless communications protocol, for authenticating a subscriber equipment into the first wireless communications system.

3. A wireless communications method implemented in a first wireless communications system implementing a first wireless communications protocol, comprising:
configuring a QoS profile;
receiving, over the first wireless network, a QoS profile request message; and
transmitting a QoS profile response message over the first wireless network;
wherein the receiving further includes receiving a list of supported-features attribute-value pairs (AVPs); and
wherein the transmitting further includes including, when all AVPs in the received list are supported, include in the QoS profile response message a complete set of features supported; and
when all AVPs in the received list are not supported, in the QoS profile response message, a complete set of features supported and further include set an Experimental-Result-Code AVP set to DIAMETER ERROR FEATURE UNSUPPORTED.

4. The wireless communications method of claim 3, further comprising:
operating an authentication, authorization and accounting (AAA) server in a second wireless communications system implementing a second wireless communications protocol for authenticating a subscriber equipment into the first wireless communications system.

5. A wireless communications apparatus for configuring Quality of Service (QoS) profiles, comprising:
a transmission module for transmitting a QoS profile request command;
a receiver module for receiving a QoS profile response message comprising a result code; and
a configuration module for performing a QoS profile configuration action responsive to the result code;
wherein the configuration module is further configured for:
aborting, when the received result code indicates an unsupported feature error, the QoS profile configuration; and
handling, when the received result code indicates success, received QoS parameters in the QoS profile message according to a predetermined procedure.

6. A method of configuring Quality of Service (QoS) profiles in a wireless network, comprising:
transmitting a QoS profile request command;
receiving a QoS profile response message comprising a result code;
performing a QoS profile configuration action responsive to the result code;
aborting, when the received result code indicates an unsupported feature error, the QoS profile configuration; and
handling, when the received result code indicates success, received QoS parameters in the QoS profile message according to a predetermined procedure.

7. A method for facilitating wireless communications having both evolved universal terrestrial radio access network (E-UTRAN) access and cdma2000 evolved high rate packet data (eHRPD) access, comprising:
providing data of a third generation partnership project 2 (3GPP2) Quality of Service (QoS) profiles in a 3GPP2 authentication, authorization and accounting (AAA) proxy/server;
providing an evolved High Rate Packet Data (eHRPD) Serving Gateway (HSGW) operable to request information of the QoS Profile of a subscribed user from the 3GPP2 AAA Proxy/Server after successful authentication of the subscribed user;
providing the 3GPP2 AAA Proxy/Server operable to send the requested information of the QoS Profile to the HSGW;
using an enhanced communication protocol between the HSGW and the 3GPP2 AAA Proxy to support QoS profile parameters, wherein the requested information of the QoS Profile is delivered to the HSGW without using a Policy and Charging Control (PCC) function.

8. The method of claim 7, further comprising:
operating the HSGW to forward the QoS Profile to an enhanced Point Coordination Function (ePCF).

9. The method of claim 7, further comprising:
using an International Mobile Subscriber Identifier (IMSI) to uniquely identify the subscribed user.

10. A system for facilitating wireless communications having both evolved universal terrestrial radio access network (E-UTRAN) access and cdma2000 evolved high rate packet data (eHRPD) access, comprising:
a first module for providing data of a third generation partnership project 2 (3GPP2) subscriber Quality of Service (QoS) Profile in a 3GPP2 authentication, authorization and accounting (AAA) proxy/server;
a second module for providing an evolved High Rate Packet Data (eHRPD) Serving Gateway (HSGW) operable to request information of the QoS Profile of a subscribed user from the 3GPP2 AAA Proxy/Server after successful authentication of the subscribed user;
a third module for using an enhanced communication protocol between the HSGW and the 3GPP2 AAA Proxy to support QoS profile parameters;
wherein the 3GPP2 AAA Proxy/Server is operable to send the requested information of the QoS Profile to the HSGW; and
wherein the requested information of the QoS Profile is delivered to the HSGW without using a Policy and Charging Control (PCC) function.

11. The system of claim 10, wherein the HSGW forwards the QoS Profile to an enhanced Point Coordination Function (ePCF).

12. A method for providing wireless communications having both E-UTRAN Access and cdma2000 eHRPD Access, comprising:
   providing data of a third generation partnership project 2 (3GPP2) QoS Profile in a 3GPP authentication, authorization and accounting (AAA)/Home Subscriber Server (HSS);
   directing data of the 3GPP2 QoS Profile of a subscribed user from the 3GPP AAA/Home Subscriber Server (HSS) to an evolved High Rate Packet Data (eHRPD) Serving Gateway (HSGW) after successful authentication of a subscribed user; and
   operating the 3GPP2 AAA Proxy/Server to send the requested QoS Profile to the HSGW, wherein the requested information of the QoS Profile is delivered to the HSGW without using a Policy and Charging Control (PCC) function.

13. The method of claim 12, further comprising:
   providing the QoS profile to the HSGW using an A11-Session Update procedure.

14. A system for providing wireless communications having both E-UTRAN Access and cdma2000 eHRPD Access, comprising:
   a first module for providing data of a third generation partnership project 2 (3GPP2) QoS Profile in a 3GPP authentication, authorization and accounting (AAA)/Home Subscriber Server (HSS);
   a second module directing data of the 3GPP2 QoS Profile of a subscribed user from the 3GPP AAA/Home Subscriber Server (HSS) to an evolved High Rate Packet Data (eHRPD) Serving Gateway (HSGW) after successful authentication of a subscribed user; and
   a third module for operating the 3GPP2 AAA Proxy/Server to send the requested QoS Profile to the HSGW;
   wherein the requested information of the QoS Profile is delivered to the HSGW without using a Policy and Charging Control (PCC) function.

15. The system of claim 14, wherein the QoS profile is delivered to the HSGW using an A11-Session Update procedure.

* * * * *